United States Patent [19]

Knierim

[11] Patent Number: 5,296,792
[45] Date of Patent: Mar. 22, 1994

[54] BIDIRECTIONAL CHOPPER TRANSCONDUCTANCE AMPLIFIER

[75] Inventor: David L. Knierim, Wilsonville, Oreg.

[73] Assignee: Tektronix, Inc., Wilsonville, Oreg.

[21] Appl. No.: 6,296

[22] Filed: Jan. 19, 1993

[51] Int. Cl.⁵ .............................................. H02P 7/00
[52] U.S. Cl. ................................ 318/685; 318/696; 318/254
[58] Field of Search ............... 318/685, 696, 280–286, 318/254, 138, 439, 681, 599, 617, 650, 677, 678, 684

[56] References Cited

U.S. PATENT DOCUMENTS

| | | | |
|---|---|---|---|
| 3,531,704 | 9/1970 | Uemura et al. | 318/254 |
| 4,259,625 | 3/1981 | Hataleyama et al. | 318/283 X |
| 4,528,486 | 7/1985 | Flaig et al. | 318/254 |
| 4,581,565 | 4/1986 | Van Pelt et al. | 318/294 |
| 4,622,500 | 11/1986 | Budelman, Jr. | 318/599 X |
| 4,703,238 | 10/1987 | Palmin et al. | 318/681 X |
| 5,032,780 | 7/1991 | Hopkins | 318/696 |
| 5,221,881 | 6/1993 | Cameron | 318/254 |

Primary Examiner—Jonathan Wysocki
Attorney, Agent, or Firm—Francis I. Gray; Ralph D'Alessandro

[57] ABSTRACT

A bidirectional chopper transconductance amplifier for driving a motor winding provides a duty cycle signal as an input to an H bridge circuit that provides a voltage output across the motor winding. The amplifier also provides a direction input that determines the polarity of the voltage output across the motor winding. An RS flip-flop is set by the pulses of a cyclical chopper sync input signal and is reset as a function of the current in the motor winding and a command current input to produce the duty cycle signal. A first pair of flip-flops, one clocked by the trailing edges of the chopper sync input signal pulses and the other clocked by the trailing edges of the chopper sync input signal pulses delayed by a specified time, detects whether the RS flip-flop is reset prior to pulse trailing edge of the current cycle and prior to the specified time of the prior cycle. A second pair of flip-flops, clocked by the trailing edges of the delayed chopper sync input signal pulses, together with an XOR gate detect whether the direction input was reversed between the prior and current cycles. Logic circuitry combines the outputs of the first pair of flip-flops with the output of the XOR gate and the status of the RS flip-flop to generate a toggle function to reverse the direction input.

8 Claims, 2 Drawing Sheets

BIDIRECTIONAL CHOPPER TRANSCONDUCTANCE AMPLIFIER

BACKGROUND OF THE INVENTION

The present invention relates to transconductance amplifiers, and more particularly to a bidirectional chopper transconductance amplifier that works in four quadrants to provide drive signals for stepper and DC servo motors.

Stepper and DC servo motor drivers typically use a transconductance amplifier. A command voltage is input to the amplifier proportional to a desired motor winding current. The transconductance amplifier controls the voltage across the motor winding so that the current in the winding approximates the desired value. Since direct linear drive of the motor voltage uses excessive power, most transconductance amplifiers use a chopping technique. For example if ten volts is needed across the motor winding, it is switched between zero volts and the supply voltage, such as forty volts, with the appropriate duty cycle, such as 25%, to give an average voltage of ten volts. If minus ten volts is needed, then the opposite end of the motor winding is connected to the supply voltage with the same duty cycle. A set of four power switches, typically transistors or FETs, is used to connect either end of the motor winding to either the supply voltage or ground. This set of power switches is called an H bridge. As with a linear version, the motor winding current is monitored and the output voltage (duty cycle) is adjusted to cause the current to approximate the desired value.

A transconductance amplifier is said to work in four quadrants if the voltage across the motor winding may be either polarity independent of the motor winding current. This is useful where the command current is positive but decreasing rapidly. The voltage may need to be negative in order to decrease the current rapidly enough through the inductance of the motor winding. Efficient four quadrant operation is difficult to achieve, especially with standard H bridge integrated circuits that do not allow sensing the motor winding current when the output voltage is zero, the recirculate state. One method is implemented in the PHASER III Color Printer manufactured by Tektronix, Inc., Wilsonville, Oreg., United States of America. In that embodiment a small current sense resistor is placed in series with the motor winding so that the motor winding current is always being sensed, even when the H bridge is in the recirculate state. A precision differential amplifier converts a small voltage signal across the current sense resistor, representative of a relatively large current through the current sense resistor, to a ground referenced voltage that is proportional to the actual motor current. The commanded current is input as a ground referenced voltage that is the inverse of the desired current. The command voltage and the output of the precision differential amplifier are summed together with opposing offset voltages in two summers to produce opposing error voltages proportional to the difference between the desired current and the measured current. These error voltages are input to respective comparators together with a triangle wave signal whose peaks are less than the offset voltages. Depending upon the signs of the error voltages, one or the other of the comparators switches, causing the H bridge to either increase or decrease the motor current to correct the current error represented by the error voltages and rebalance the circuit.

What is desired is another method for a bidirectional chopper transconductance amplifier that does not require a precision differential amplifier or much analog circuitry.

SUMMARY OF THE INVENTION

Accordingly the present invention provides a bidirectional chopper transconductance amplifier for driving a motor winding that produces a control signal having a variable duty cycle as an input to an H bridge circuit. The H bridge circuit provides an average voltage output across the motor winding as a function of the control signal with a polarity determined by a direction input. An RS flip-flop is set by the pulses from a cyclical chopper sync input signal, and is reset as a function of the comparison of the current through the motor winding when the H bridge applies a voltage across it with a command current represented by a command current input signal. A first pair of flip-flops, one clocked by one of the edges of the pulses at a first time within a chopper sync input signal cycle and the other clocked at a second time within the chopper sync input signal cycle delayed from the first time, detects whether the RS flip-flop is reset prior to the first time within the current cycle and prior to the second time within the prior cycle. A second pair of flip-flops, clocked at the second time, together with an XOR gate detect whether the direction input was reversed between the prior and current cycles. Logic circuitry combines the outputs of the flip-flops to provide a polarity signal to the direction input of the H bridge that causes the direction input to toggle either when the RS flip-flop resets prior to the first time of the current cycle and prior to the second time in the prior cycle, or when the polarity signal reversed between the prior and current cycles and the RS flip-flop resets prior to the second time in the current cycle.

The objects, advantages and other novel features of the present invention are apparent from the following detailed description when read in conjunction with the appended claims and attached drawing.

DESCRIPTION OF THE PREFERRED EMBODIMENT

Figure 1:
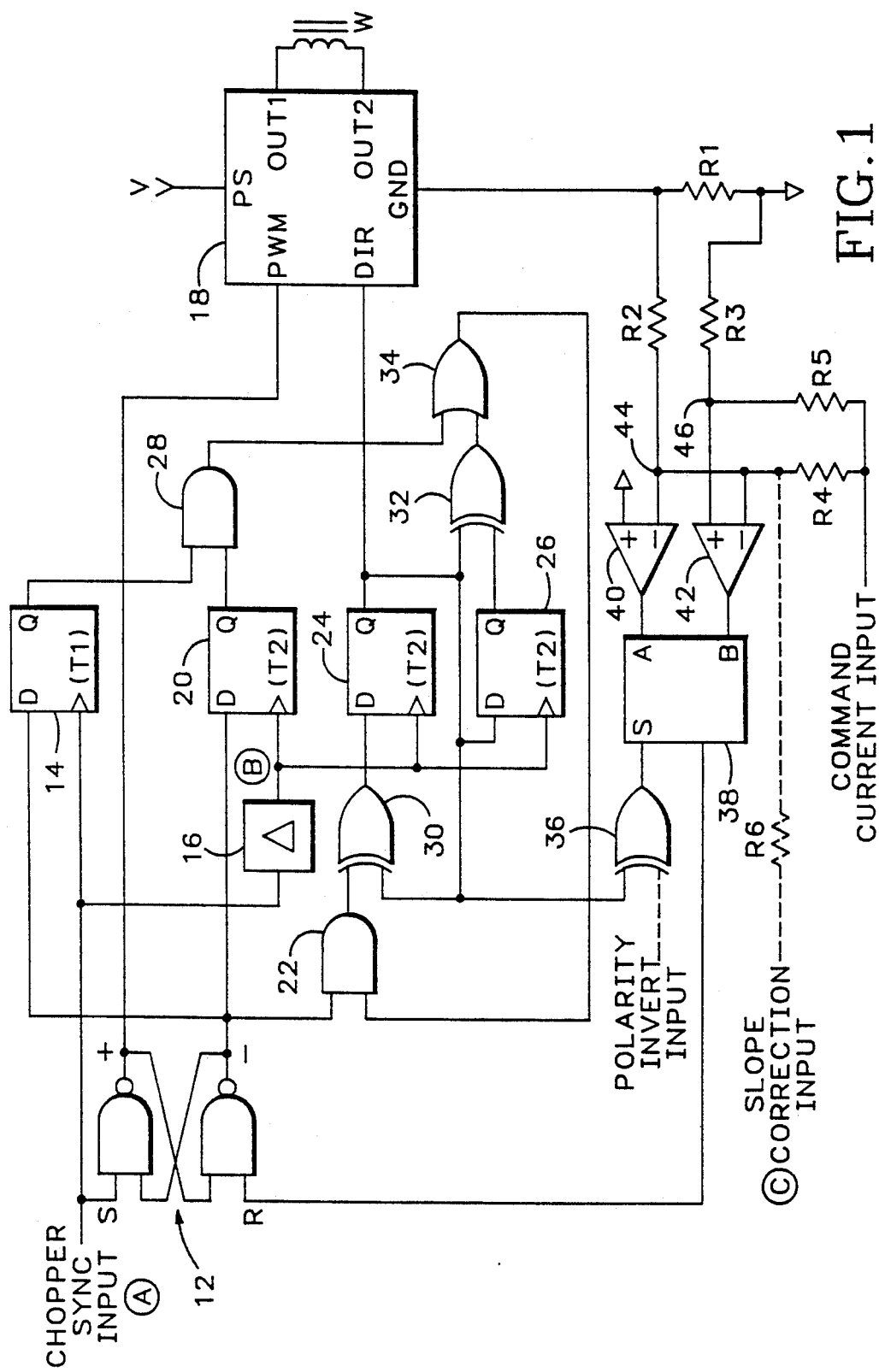
FIG. 1 is a block diagram of a bidirectional chopper transconductance amplifier according to the present invention.
Figure 2:
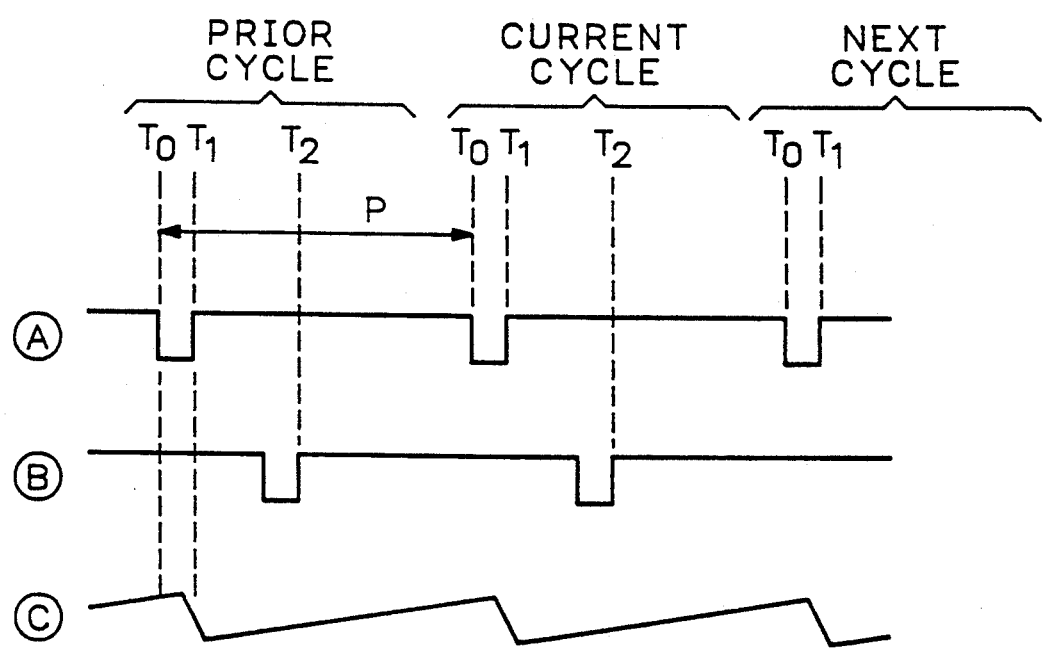
FIG. 2 is a waveform diagram for signals pertinent to the bidirectional chopper transconductance amplifier according to the present invention.

Referring now to FIGS. 1 and 2 a chopper sync signal (A), having negative pulses occurring periodically, is applied to the set terminal of an RS flip-flop 12, to the clock input of a first D-type flip-flop 14, and to the input of a delay circuit 16. The positive output from the RS flip-flop 12 is applied as a control signal to the pulse width modulated (PWM) input of a conventional H bridge circuit 18. The negative output from the RS flip-flop 12 is applied to the input of the first D-type flip-flop 14, to the input of a second D-type flip-flop 20, and to one input of a first AND gate 22. The output (B) of the delay circuit 16 is applied to the clock inputs of the second flip-flop 20 and of first and second directional D-type flip-flops 24, 26. The positive (Q) outputs of the first and second D-type flip-flops 14, 20 are applied as inputs to a second AND gate 28. The positive (Q) output of the first directional D-type flip-flop 24 is applied as a polarity signal to the directional input (DIR) of the H bridge circuit 18. The H bridge circuit 18 is coupled between a power supply voltage V and ground via a sense resistor R1 in the power supply lead. The output of the H bridge circuit 18 is coupled across a motor winding W.

The positive output (Q) of the first directional D-type flip-flop 24 is also applied to one input of first and second exclusive OR (XOR) gates 30, 32 and to the D input of the second directional D-type flip-flop 26. The other input of the first XOR gate 30 is coupled to the output of the first AND gate 22, and the other input of the second XOR gate 32 is coupled to the positive output (Q) of the second directional D-type flip-flop 26. The outputs from the second AND and second XOR gates 28, 32 are input to an OR gate 34. The output of the OR gate 34 is applied to the other input of the first AND gate 22. The positive output (Q) of the first directional D-type flip-flop 24 is further applied via a third XOR gate 36 to the select input of a multiplexer circuit 38. The output of the multiplexer circuit 38 is applied to the reset input of the RS flip-flop 12. An optional polarity invert signal may be applied to a second input of the third XOR circuit 36 to provide an additional select signal to the multiplexer circuit 38.

The opposite ends of the sense resistor R1 are coupled via resistors R2, R3 to a pair of comparators 40, 42. The H bridge side of the sense resistor R1 is applied to the negative input of the first comparator 40 via resistor R2, and the ground side of the sense resistor is applied to the positive input of the second comparator 42 via resistor R3. The positive input of the first comparator 40 is coupled to ground. A command current input signal via resistor R4 is applied to the negative inputs of both comparators 40, 42 and via resistor R5 to the positive input of the second comparator. An optional slope correction signal (C) also may be applied via resistor R6 to the negative inputs of both comparators 40, 42. The value of the sense resistor R1 is small compared to the other resistors. For example the value of the sense resistor R1 may be on the order of 0.1–0.5 ohms while the values for the other resistors are on the order of kilo-ohms. Current flows through the sense resistor R1 during the period when the H bridge circuit 18 applies voltage across the motor winding W, as the current in the motor winding is drawn from the power supply V during that period. However during the recirculate state of the H bridge circuit 18 the motor winding current draws negligible current from the power supply V.

In operation the negative pulses of the chopper sync signal (A) set the RS flip-flop 12 to apply the power supply voltage V via the H bridge circuit 18 to one end of the motor winding W. The output from the multiplexer circuit 38 resets the RS flip-flop 12, thereby establishing the duty cycle for the control signal with the minimum duty cycle being the ratio of the negative pulse width to the pulse period P per cycle. The positive output of the RS flip-flop 12 is forced to remain set during the sync pulse width independent of the reset signal. This eliminates the effect of short high current transients common when the H bridge circuit 18 switches voltage on one of its outputs. The RS flip-flop 12, H bridge circuit 18 and second comparator 42 form a standard two quadrant current mode control circuit. The polarity signal at the direction input DIR to the H bridge circuit 18 determines the polarity of the instantaneous voltage applied to the motor winding. During every chopper sync pulse the RS flip-flop 12 is set, causing the H bridge circuit 18 to output plus/minus power supply voltage, depending upon the polarity signal, to the motor winding W. When the current ramps up to the level indicated by the command current input signal, the second comparator 42 switches low, resetting the RS flip-flop 12, causing the H bridge circuit 18 to switch back to outputting zero volts, i.e., recirculate state. If duty cycles over 50% are expected and sub-harmonic oscillations are not acceptable, the slope correction sawtooth wave (C) may be added, as is commonly done in current mode controllers, at the negative inputs of the comparators 40, 42.

Adding four quadrant capability is a matter of intelligent control of the direction input to the H bridge circuit 18. No current flows through the ground pin of the H bridge circuit 18 while the PWM input is low, i.e., the H bridge circuit is in the recirculate state. To force the winding current toward the command current specified by the command current input signal, a first direction is asserted. If it is the "wrong" direction, in the sense that the winding current already exceeds the command current in the direction the current is being driven, then the opposite direction is tried on the next chopper sync pulse. In other words if keeping the PWM input high past the trailing (rising) edge of the chopper sync pulse causes the winding current to go farther from the command current, then the current direction needs to be reversed. This simplistic operation generates objectionable sub-harmonic oscillations at both low and high duty cycles. However the circuit shown in FIG. 1 reverses direction based on the following algorithm:

a. if the output of the multiplexer circuit 38 is low by the first time T1 of the current chopper sync pulse cycle and was low by the second time T2 of the prior chopper sync pulse cycle, then the direction is reversed for the next chopper sync pulse cycle; or b. if the output of the multiplexer circuit 38 is low by the second time T2 of the current chopper sync pulse cycle and the direction had reversed between the prior and current cycles, then the direction is reversed again for the next cycle; otherwise c. if neither a. nor b. is met, then the direction is maintained for the next cycle.

The first half of the first reversal condition above is the simplistic version discussed above. ANDing that with the condition of the output of the multiplexer circuit 38 going low before T2 of the prior cycle prevents false switching due to sub-harmonic oscillation. The second reversal condition insures a reversal every cycle for output voltages near zero. Because the sync pulse width defines a minimum "on" time for the motor winding output from the H bridge circuit 18, average output voltages near zero are not achieved without using a combination of positive and negative output pulses. Forcing reversal on every cycle under these conditions prevents the possibility of lower frequency sub-harmonics. The time between T0 and T2 is (a) at least three times the sync pulse width or (b) twice the time between T0 and T1 plus the sync pulse width (where T1 occurs after the trailing edge of the sync pulse). Although as shown in FIG. 2 time T1 is shown occurring at the trailing edge of the sync pulse, the sync pulse may end either before or after T1, but before T2, by inserting a delay circuit between the chopper sync input signal and the clock input of the first D-type flip-flop 14 and using either pulse edge for clocking.

As an example for a sine wave command current starting at a positive crest and heading down towards zero, initially the current through and voltage across the motor winding W are of the same polarity and the direction input to the H bridge circuit 18 remains positive. The motor winding W is connected to the power supply voltage V in a positive manner at each time T0 and is connected back to ground sometime after T2. As the command current ramps down, less and less voltage is needed across the motor winding W. The return to ground time progresses back across T2 towards T1. As the return to ground time hits T1, both first and second flip-flops 14, 20 are set, causing the first directional D-type flip-flop 24 to toggle the direction input of the H bridge circuit 18. At this point the average output voltage has reached the minimum achievable with all positive output pulses. For this example where T1−T0 equals the pulse width, this voltage is V*(T1−T0)/P where P is the period of the chopper sync pulse input (A). As an example if V=40, T1−T0=2 us and P=16 us, then this minimum voltage is five volts.

Once the direction input has toggled, it continues to toggle on every cycle according to the second reversal condition above. First and second directional D-type flip-flops 24, 26 have opposite states so that the output of the second XOR gate 32 is true. To maintain the minimum voltage average output, the H bridge circuit 18 outputs the minimum two microsecond negative pulse on one cycle followed by a six microsecond positive pulse on the next cycle. The sequence of two microseconds reverse and six microseconds forward maintains the same average of five volts as the sequence of two microseconds positive does. The specified duration T2−T0 greater than six microseconds allows this sequence to continue. Otherwise the first AND gate 22 does not allow the toggle condition to pass.

As the command current continues to ramp down faster the required output voltage decreases through zero and goes negative. At zero average output voltage the H bridge circuit 18 outputs the minimum positive pulse followed by a minimum negative pulse, etc. Then the negative pulse width starts growing with the positive pulse remaining at the minimum value. As the output voltage exceeds the negative minimum value, the negative pulse width exceeds six microseconds. When the negative pulse width exceeds T2−T0, the direction toggling ceases and only negative pulses are output to the motor winding W.

When the motor winding current, corresponding to the command current input signal, and the instantaneous output voltage from the H bridge circuit 18 are both positive, the voltage drop across sense resistor R1 is positive and the second comparator 42 is used to compare the sensed current with the command current, i.e., the command current input signal is positive and the same polarity as the sensed voltage. When the motor winding current and instantaneous output voltage are both negative, the voltage drop across the sense resistor R1 is still positive, but opposite in polarity to the command current input signal, which is negative. Therefore the first comparator 40 is used to compare the sensed current with the command current. The case of negative motor winding current and positive instantaneous output voltage uses the second comparator 42 as the sensed voltage is negative, i.e., the same polarity as the command current input signal. Finally the case of positive motor winding current and negative instantaneous output voltage uses the first comparator 40, as the sensed voltage is negative, i.e., opposite in polarity to the command current input signal. "Instantaneous output voltage" refers to the output voltage of the H bridge circuit 18 applied across the motor winding W while the RS flip-flop 12 is set, and not to the average output voltage. The instantaneous output voltage is positive whenever the direction input is high and negative whenever the direction input is low. Resistors R2, R4 form a first voltage divider with a first node 44 coupled to the negative input of the first comparator. The relative values are determined by the scale factor between the range of voltages across the sense resistor R1 and the command current input signal voltage range. In other words the switch point for the first comparator is f*S+C=0 where f is the scale factor, S is the sense voltage across the sense resistor R1 and C is the control current input signal voltage. Likewise the switch point for the second comparator 42 is determined by the voltage divider of resistors R3 and R5 which forms a second node 46, i.e., at C=f*S.

The optional polarity inversion input is useful for operation with only positive supply voltages. In this mode the absolute value of the command current is input and the sign bit (high for negative) of the command current input signal is coupled to the other input of the third XOR gate 36. Negative currents are then requested with a positive input voltage and the polarity inversion input set.

Thus the present invention provides a bidirectional chopper transconductance amplifier for a motor winding that intelligently controls a polarity signal input to an H bridge circuit which controls the chopped voltage applied across the motor winding.

What is claimed is:

1. A bidirectional chopper transconductance amplifier for controlling a voltage applied across a motor winding to generate a current through the motor winding comprising:

means for generating a control signal having a duty cycle determined by a command current input representing a desired magnitude and polarity for the current and a sensed current through the motor winding representing an actual magnitude and polarity for the current during the time while the voltage is applied across the motor winding in response to the control signal; and means for automatically determining from the sensed current, the command current input and a direction input for a prior and a current cycle of the control signal the direction input that determines the polarity of the voltage applied across the motor winding for a next cycle of the control signal.

2. The transconductance amplifier as recited in claim 1 wherein the generating means comprises:

an input flip-flop that is set by the pulses of a chopper sync input signal, the positive output of the input flip-flop providing the control signal; and means for comparing the sensed current with the command current input to generate a reset signal for the input flip-flop that determines the duty cycle as a function of the direction input for the current cycle and the relative polarities of the sensed current and the command current input.

3. The transconductance amplifier as recited in claim 2 wherein the automatically determining means comprises:

means for detecting a time when the reset signal is generated within the prior and current cycles of the chopper sync input signal, each cycle having a first time and a second time, the second time being later within the cycle than the first time; and means for toggling the direction input for a next cycle of the chopper sync input signal to reverse the polarity of the voltage output as a function of the detected time if (a) the reset signal is generated before the first time within the current cycle and also was generated before the second time within the prior cycle, or (b) the reset signal is generated before the second time of the current cycle and the direction input was toggled to reverse the polarity of the voltage output between the prior and current cycles.

4. The transconductance amplifier as recited in claim 3 wherein the detecting means comprises:
a first flip-flop that is clocked at the first time relative to an edge of the pulses from the chopper sync input signal, an input of the first flip-flop being coupled to a negative output of the input flip-flop and an output of the first flip-flop providing a true signal when the input flip-flop is reset prior to the first time for the current cycle;
means for delaying the chopper sync input signal by a specified delay time which determines the second time; and
a second flip-flop that is clocked by a trailing edge of the pulses from the delayed chopper sync input signal, an input of the second flip-flop being coupled to the negative output of the input flip-flop and the output of the second flip-flop providing a true signal when the input flip-flop is reset prior to the second time.

5. The transconductance amplifier as recited in claim 4 wherein the toggling means comprises:
a first AND gate having as inputs the outputs from the first and second flip-flops to provide a true output when the input flip-flop is reset in the current cycle prior to the first time and was reset in the prior cycle prior to the second time;
means for determining a state that indicates whether the direction input was toggled between the prior and current cycles; and
means for generating as a function of the determined state and the true output from the first AND gate a toggle function for reversing the direction input.

6. The transconductance amplifier as recited in claim 5 wherein the state determining means comprises:
a first directional flip-flop clocked by the delayed chopper sync input signal having as an input the toggle function and providing the direction input as an output;
a second directional flip-flop clocked by the delayed chopper sync input signal having as an input the direction input from the prior cycle and providing an output; and
a first XOR gate having as inputs the outputs of the first and second directional flip-flops to provide a true output when the outputs of the first and second directional flip-flops are of opposing states.

7. The transconductance amplifier as recited in claim 6 wherein the generating means comprises:
an OR gate having as inputs the outputs of the first AND gate and first XOR gate to provide a true output when either input is true;
a second AND gate having as inputs the output of the OR gate and the negative output of the input flip-flop to provide a true output when the input flip-flop is reset and the OR gate provides the true output; and
a second XOR gate having as inputs the output of the second AND gate and the direction input to provide the toggle function as the input to the first directional flip-flop.

8. The transconductance amplifier as recited in claim 2 wherein the comparing means comprises:
means for generating a voltage drop from the sensed current;
a first comparator coupled to compare the sensed current and the command current input when the respective currents are opposite in polarity to provide a reset output;
a second comparator coupled to compare the sensed current and the command current input when the respective currents are the same in polarity to provide a reset output; and
means for selecting the reset output from one of the comparators as a function of the direction input as the reset signal for the input flip-flop.

* * * * *